United States Patent
Polvi et al.

(10) Patent No.: US 6,740,179 B2
(45) Date of Patent: May 25, 2004

(54) METHOD FOR MAKING A JOINT BETWEEN COPPER AND STAINLESS STEEL

(75) Inventors: Vëikko Polvi, Pori (FI); Pekka Taskinen, Pori (FI); Tuija Suortti, Pori (FI)

(73) Assignee: Outokumpu Oyj, Espoo (FI)

( * ) Notice: Subject to any disclaimer, the term of this patent is extended or adjusted under 35 U.S.C. 154(b) by 0 days.

(21) Appl. No.: 10/203,972

(22) PCT Filed: Feb. 21, 2001

(86) PCT No.: PCT/FI01/00169
§ 371 (c)(1),
(2), (4) Date: Aug. 14, 2002

(87) PCT Pub. No.: WO01/62432
PCT Pub. Date: Aug. 30, 2001

(65) Prior Publication Data
US 2003/0010410 A1 Jan. 16, 2003

(30) Foreign Application Priority Data
Feb. 23, 2000 (FI) .............................. 20000409

(51) Int. Cl.$^7$ .............................................. B23K 20/227
(52) U.S. Cl. ..................................... 148/532; 228/194
(58) Field of Search ........................... 148/532; 228/194

(56) References Cited

U.S. PATENT DOCUMENTS

| | | | |
|---|---|---|---|
| 4,194,672 A | 3/1980 | Uto et al. | 228/194 |
| 5,664,723 A | 9/1997 | Sastri | 228/124.1 |

*Primary Examiner*—George Wyszomierski
(74) *Attorney, Agent, or Firm*—Morgan & Finnegan, LLP

(57) ABSTRACT

A method for making a joint between copper or copper alloys and austenitic steel alloys, in which method in between the junction surfaces of the objects to be joined together, there is arranged at least one intermediate layer, so that the junction surfaces, including their intermediate layers, are pressed together, and at least the junction area is heated in order to create a diffusion joint. In the method, there is brought a first intermediate layer (3) on the junction surface of the steel object (2) or against said surface, in order to activate the creation of the diffusion joint.

10 Claims, 1 Drawing Sheet

METHOD FOR MAKING A JOINT BETWEEN COPPER AND STAINLESS STEEL

Figure 1:
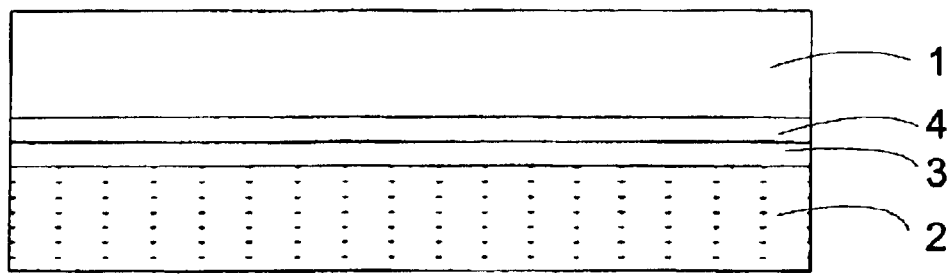

The present invention relates to a method according to the preamble of claim 1.

In the prior art, there are known several different methods for making joints between stainless steel and copper. When joining copper and stainless steel together, several factors must be taken into account, among them the different strengths of the materials in high temperatures, as well as their differences in thermal conductivity, thermal expansion and melting temperatures. In joining methods, such as soldering or welding, problems are caused by so-called soldering brittleness, which means the penetration of copper in a diffusion joint to the grain limits of steel, which makes the joint remarkably brittle. The U.S. Pat. No. 4,194,672 discloses a method for joining copper and stainless steel by diffusion welding. In said method, a thin layer of nickel, nickel alloys, Ni+Cr or Cr+Ni, is used in between the junction surfaces of the pieces to be joined in order to prevent copper from being diffused to the grain limits of stainless steel and to improve adhesion. The joint is diffusion welded at a temperature of 850°–950° C. The method requires a relatively high temperature and a long period of thermal treatment in order to create the joint. Moreover, the strength of the joint achieved by means of this method is limited. The U.S. Pat. No. 5,664,723 introduces a soldering technique where a piece of copper is joined to metal or to a ceramic material. The joint of copper and stainless steel disclosed in said publication is made by using an extremely thin nickel layer as a diffusion barrier on the steel surface, and in addition by using a tin layer as a soldering agent on the copper surface. The pieces are brought together and heated in two steps, first up to 400° C. for the duration of one hour, and after that additionally up to 800° C. for the duration of 20 minutes. Thus the applied method requires a relatively long heating period in two steps.

The object of the present invention is to realize a method for making a joint whereby the drawbacks known in the prior art solutions can be avoided. Another object of the invention is to realize a joint that maintains good electro-conductive capacities even in corrosive conditions of extensive duration. Yet another object of the invention is to realize a joint that has a good resistance in high temperatures.

The invention is characterized by what is specified in the appended claims.

The method according to the invention is mainly characterized in that a first intermediate layer is brought onto the junction surface of the steel object or against said surface, mainly in order to prevent the loss of nickel from the steel object, and at least a second intermediate layer onto the junction surface of the copper object or against said surface in order to activate the creation of a diffusion solution. According to a preferred embodiment, the first intermediate layer is chosen from the following group: nickel (Ni), chromium (CR), a mixture or alloy of nickel and chromium (Ni+Cr), a mixture of chromium and nickel (Cr+Ni). According to a preferred embodiment, the second intermediate layer mainly consists of tin (Sn).

According to a preferred embodiment of the invention, there is additionally arranged at least a third intermediate layer in between the first intermediate layer and the copper object. According to a preferred embodiment of the method, there is brought at least a second intermediate layer and at least a third intermediate layer, and the melting temperature of the second intermediate layer is lower than that of the third intermediate layer. The third intermediate layer may consist mainly of silver (Ag), or it can be an alloy or mixture of silver (Ag) and copper (Cu). According to a preferred embodiment of the method, the junction area is heated in one step.

The method according to the invention has several important advantages. By applying a nickel layer on the steel surface when making the joint, it is possible to prevent a nickel loss that could take place from the austenitic stainless steel towards copper and could embrittle the steel. The creation of the joint is activated by means of a soldering agent layer at the junction surface between the copper surface and the nickel-plated steel sheet. By means of the activator, lower joining temperatures can be used, so that the thermal stresses created in the junction area are smaller. By using the intermediate layers according to the invention, a one-step heating of the junction can be applied in the creation of the joint. By means of the arrangement according to the invention, there are achieved joints that have a better tensile strength than the conventional diffusion joint.

In this application, the term copper refers to, apart from objects made of copper, also to alloy materials with a copper content that essentially includes at least 50% copper. The term stainless steel in this application refers mainly to austenitic alloy steels, such as stainless and acid-proof steels.

Figure 2:
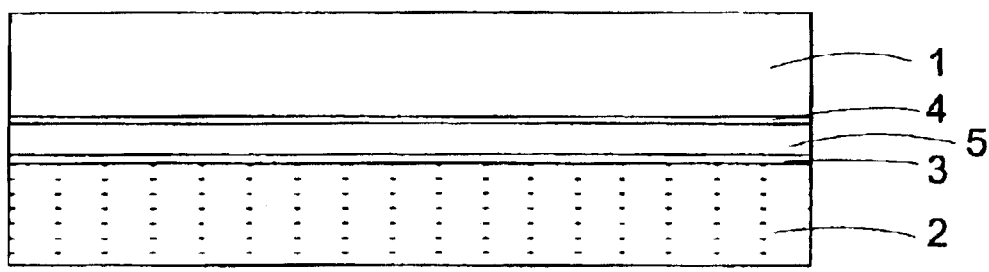
Figure 3:
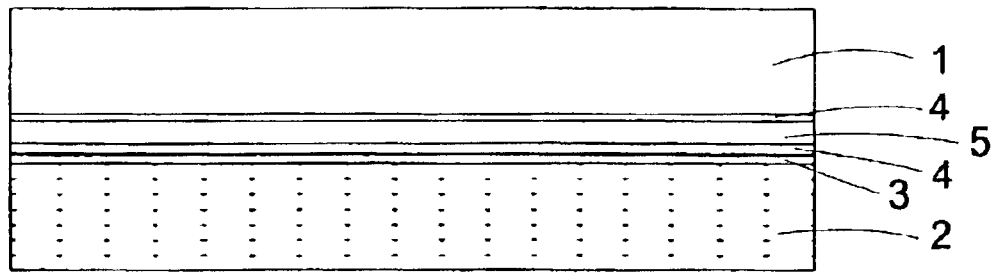

The invention is explained in more detail below, with reference to the appended drawings, where FIG. 1 illustrates the structure of a joint according to the invention prior to the heating step, FIG. 2 illustrates the structure of another joint according to the invention prior to the heating step, and FIG. 3 illustrates the structure of a third joint according to the invention prior to the heating step.

In the method according to the invention, there is made a joint between an object 1 consisting mainly of copper, and austenitic stainless steel 2, in which method there are provided several intermediate layers in between the surfaces to be joined, at least one of said intermediate layers consisting of a soldering agent. The surfaces are placed against each other and pressed together, so that the soldering agent remains in between the compressed surfaces. Heat is brought at least to the junction area, so that there is created a diffusion joint.

FIG. 1 illustrates an embodiment of the joining method according to the invention shown in cross-section, prior to the thermal treatment. An object 1 essentially consisting mainly of copper, and another object 2 consisting of austenitic stainless steel, are thereby joined together. In the junction between the two objects, there are arranged intermediate layers 3, 4. The first intermediate layer 3 placed against the steel includes mainly nickel (Ni). In addition, when creating the joint there also is used a second intermediate layer 4, i.e. a so-called activator layer, which in the case of the example is for instance tin (Sn). Tin functions as the activator and results in a lowering of the temperature, which is required in the creation of the joint.

The first intermediate layer 3 can be formed on the stainless steel surface by means of a separate treatment. When nickel is used as the first intermediate layer 3, said layer can be created on the stainless steel surface for example by means of electrolysis. Nickel-plating is typically carried out so that the passivation layer provided on the stainless steel surface does not present an obstacle to the material transfer on the junction surface between stainless steel and nickel. The first intermediate layer 3 can also exist in the form of foil.

When heating the junction area, there is created a diffusion joint on the surfaces of the objects to be joined together; this takes place as a result of the nickel diffusion on one hand, and as a result of the diffusion of the copper and steel components on the other. The creation of the diffusion joint, and the structures created therein, are activated by means of an extremely thin second intermediate layer 4 required by the applied manufacturing conditions and the desired joint, i.e. the soldering agent layer, or by means of a mixture of several intermediate layers 4, 5 placed on the junction surface between the nickel-plated steel object 2 and the copper object 1.

The employed soldering agents of the intermediate layers 4, 5 as well as the diffusion-activating agents can be silver-copper alloys and tin in pure or specific layer structures. Mechanically strong joints are obtained within the temperature range of 600–800° C. The selection of thermal treatment periods can be carried out so that the creation of brittle intermetallic phases in the final joint are avoided. The soldering agent thicknesses, as well as the thermal treatment temperature and duration are chosen so that the nickel loss from steel is prevented as a result of the alloy with a high nickel content provided on the surface thereof. An advantage of a low joining temperature is that the thermal stresses created in the junction area are minimal.

FIG. 2 illustrates another preferred embodiment of the joining method according to the invention prior to the thermal treatment. An object 1 essentially consisting of copper, and another object 2 consisting of austenitic stainless steel, are thereby joined together. In the junction between the two objects, there are arranged several intermediate layers 3, 4, 5. The first intermediate layer 3 placed against the steel includes mainly nickel (Ni). In addition, when creating the joint there also is used a second intermediate layer 4, i.e. a so-called activator agent, which in the case of the example is tin (Sn). Tin functions as an activator when making the joint and results in a lowering of the temperature, which is required in the creation of the joint. In addition to the tin layer, the junction includes, in between the tin layer 4 and the nickel layer 3, a third intermediate layer 5, which preferably consists of another soldering agent. In a preferred embodiment, it is an Ag+Cu soldering agent, advantageously in the form of foil. According to a preferred embodiment, the second soldering agent layer includes, in percentages by weight, Ag 71% and Cu 29%. Advantageously the soldering agent has, with a given alloy composition, a eutectic composition with copper.

FIG. 3 illustrates yet another embodiment of the method according to the invention prior to heating the joint. There a second intermediate layer 4 is provided on both surfaces of the third intermediate layer 5, or against said surfaces. In this embodiment, there can typically be used a layer foil, where one or both surfaces of the foil are treated for instance with tin.

The thicknesses of the intermediate layers used in the method vary. The thickness of the Ni layer employed as the first intermediate layer is typically 2–50 µm. After electrolysis, it is typically 2–10 µm, as a foil of the order 20–50 µm. The thickness of the Ag or Ag+Cu foil employed as the third intermediate layer is typically 10–500 µm, preferably 20–100 µm. The thickness of the second intermediate layer 4 is typically dependent on the thickness of the third intermediate layer 5, and is for instance 10–50% of the thickness of the third intermediate layer. Extremely high-quality joints have been achieved by applying for instance a 5–10 µm tin layer on the surfaces of a 50 µm thick Ag+Cu soldering agent foil. The tin layers can be formed for example by immersing the soldering agent in the form of foil in molten tin, and when necessary, by thereafter rolling the foil to be smooth.

EXAMPLE I

Acid-proof steel (AISI 316) and copper (Cu) were joined together. On the steel junction surface, there was provided, as a first intermediate layer, a nickel (Ni) layer with the thickness of 7 µm. As a diffusion activator and soldering agent, there was used an Ag+Cu soldering agent having a eutectic composition, including in percentages by weight 71% Ag and 29% Cu. The soldering agent was in the form of foil with the thickness of 50 µm, and on the foil surface there was also formed a tin (Sn) layer with a thickness of the order 5–10 µm. The objects to be joined together were placed against each other, so that the foil was left in between the junction surfaces. The objects were pressed together, and the junction area was heated above the melting temperature of the soldering agent, up to a temperature of about 800° C. The holding time was about 10 minutes. The junction according to the example succeeded excellently.

What is claimed is:

1. A method for making a diffusion joint between a junction surface of a copper or copper alloy and a junction surface of an austenitic steel alloy, the method comprising placing a first intermediate layer on the junction surface of the steel alloy or against said surface, mainly in order to prevent nickel loss from the steel alloy, placing at least a second intermediate layer on the junction surface of the copper alloy or against said surface in order to activate creation of a diffusion joint, and arranging at least a third intermediate layer in between the first intermediate layer and the copper alloy, the third intermediate layer consisting mainly of silver (Ag), or of silver (Ag) and copper (Cu) either as an alloy or in a mixture, pressing together the junction surfaces to form respective junction areas therebetween, and heating the junction areas to create the diffusion joint.

2. A method according to claim 1, wherein the first intermediate layer is selected from the group consisting of: nickel (Ni), chromium (Cr), a mixture or alloy of nickel and chromium (Ni+Cr), and a mixture of chromium and nickel (Cr+Ni).

3. A method according to claim 1, wherein the second intermediate layer consists mainly of tin (Sn).

4. A method according to claim 1, wherein the melting temperature of the second intermediate layer is lower than the melting temperature of the third intermediate layer.

5. A method according to claim 1, wherein the junction areas are heated in one step.

6. A method according to claim 1, wherein the junction areas are heated up to the temperature of 600–850° C.

7. A method according to claim 1, wherein the thickness of the first intermediate layer is about 2–50 µm.

8. A method according to claim 1, wherein the thickness of the third intermediate layer is about 10–500 µm.

9. A method according to claim 1, further comprising placing the second intermediate layer onto a junction surface of the third intermediate layer.

10. A method according to claim 1, wherein at least one of the intermediate layers is in the form of foil.

* * * * *